April 17, 1934.  W. B. RANNEY ET AL  1,954,842
BOX PACKING MACHINE
Filed Feb. 6, 1931   10 Sheets-Sheet 5

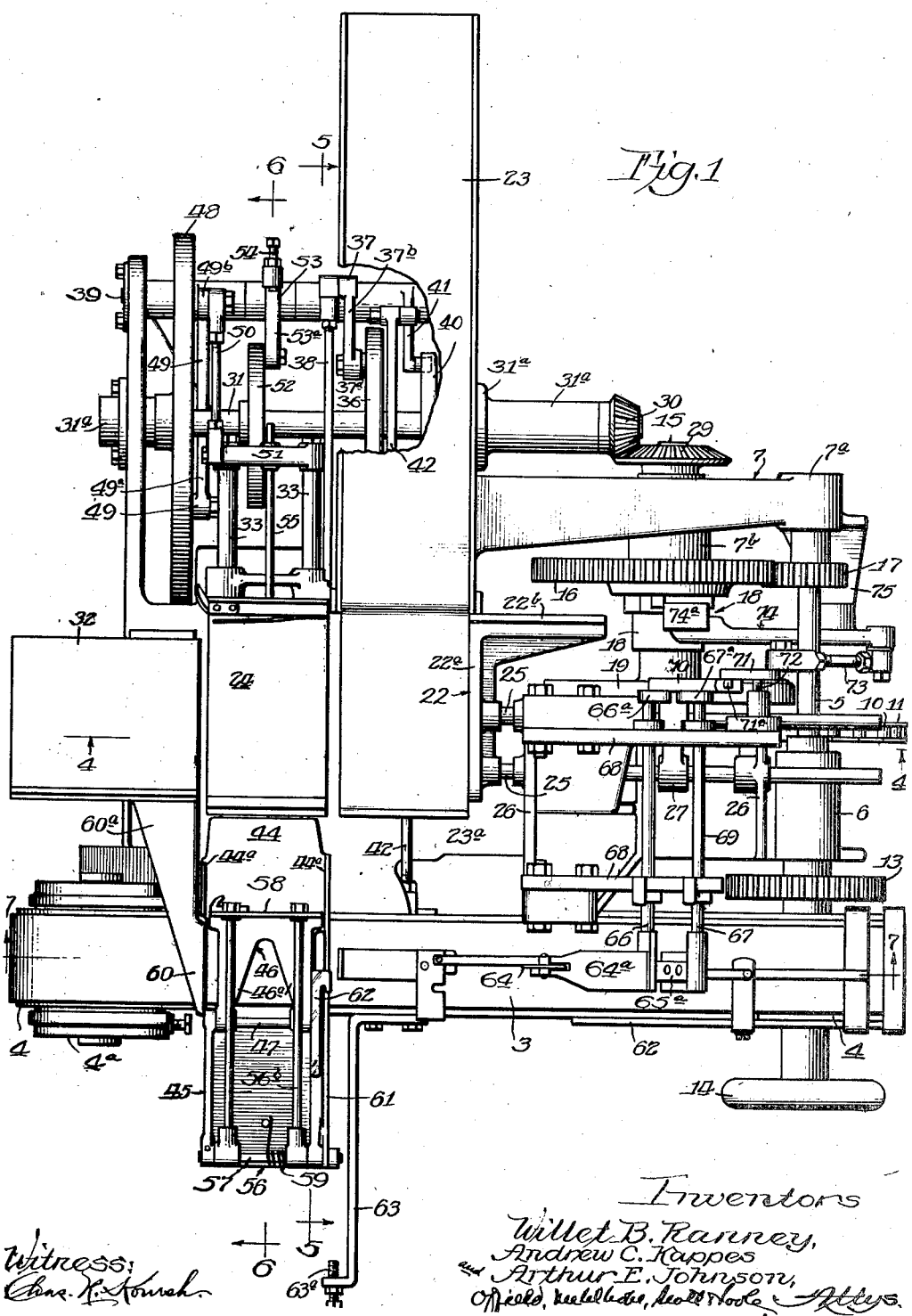

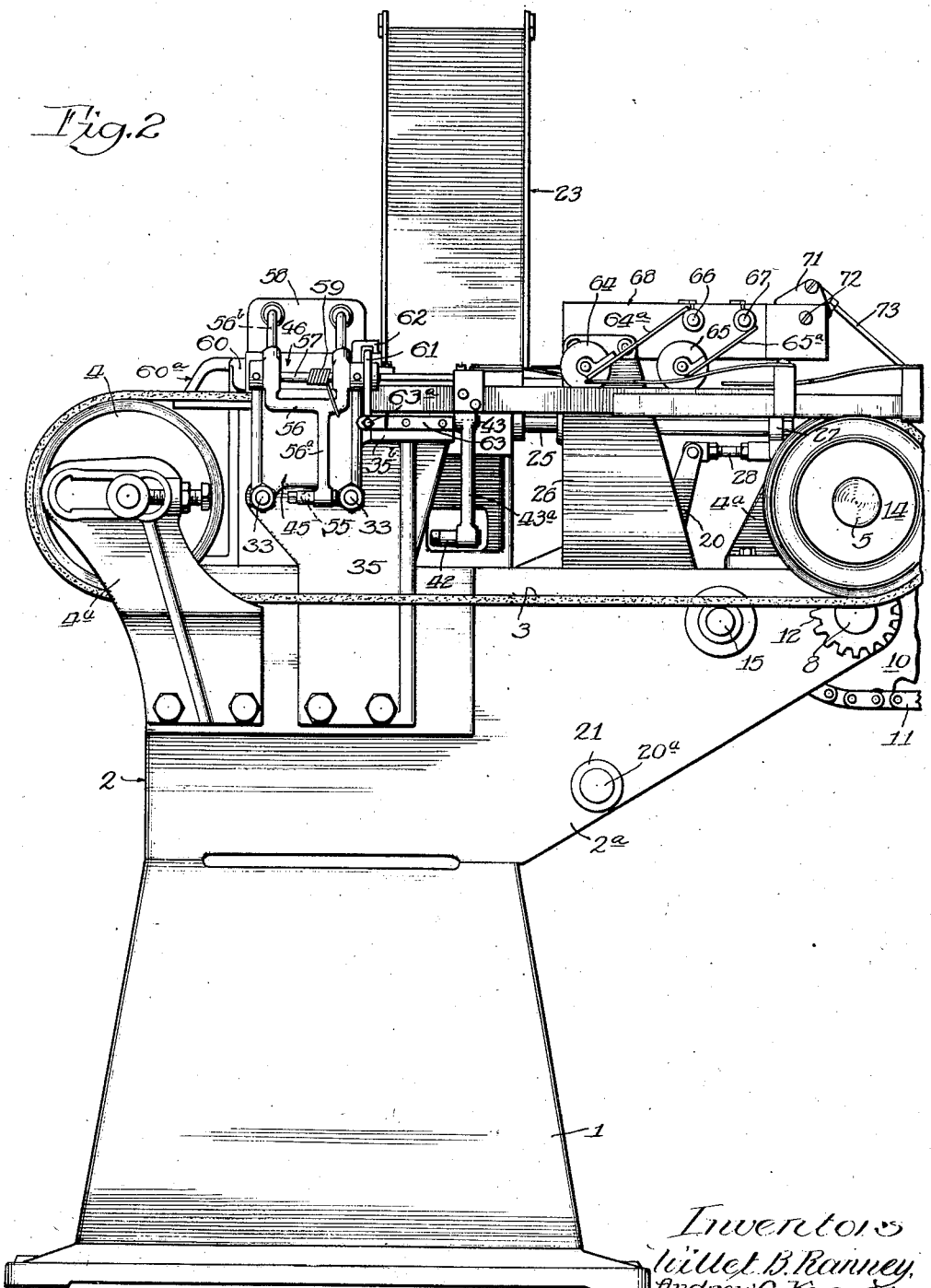

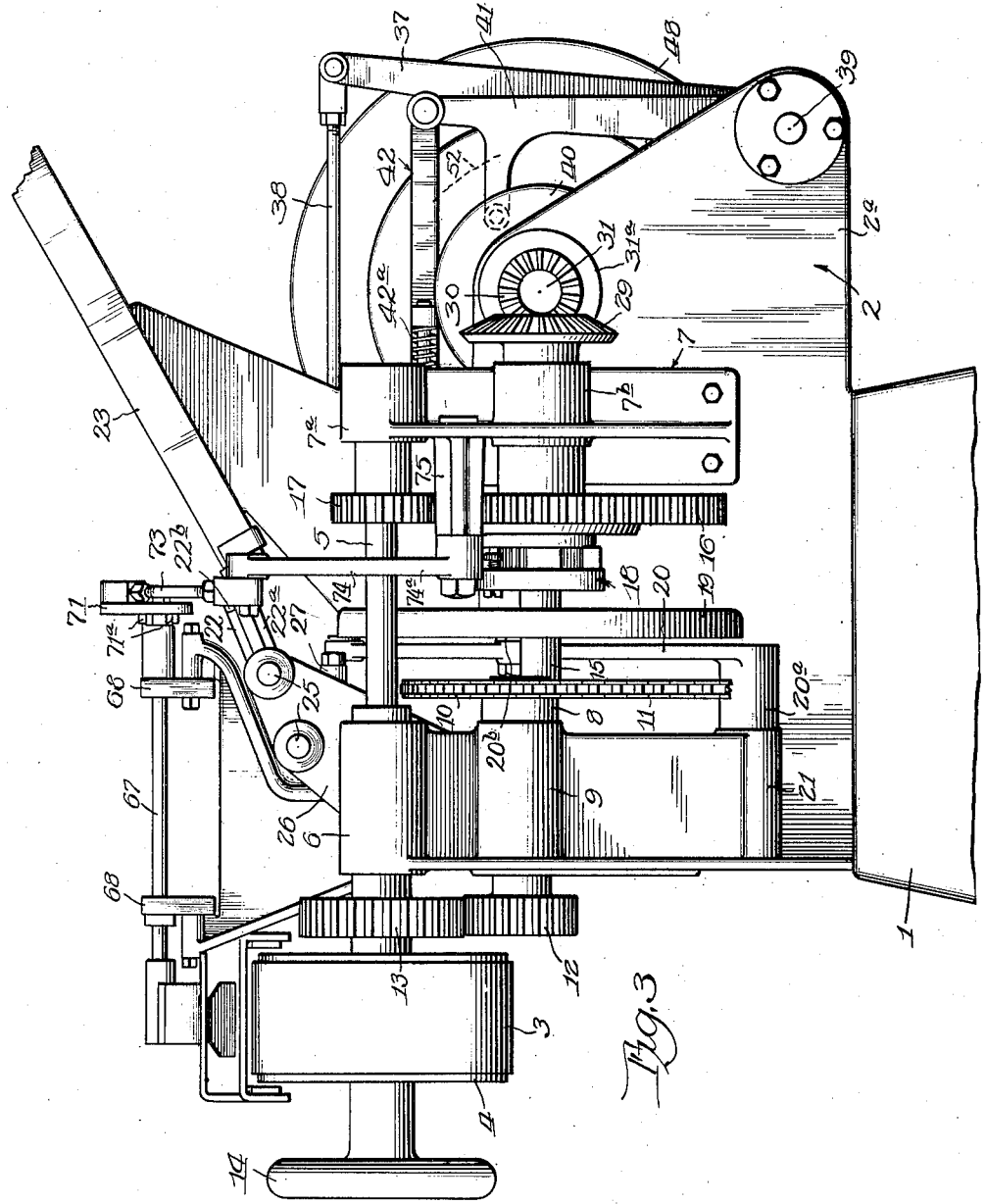

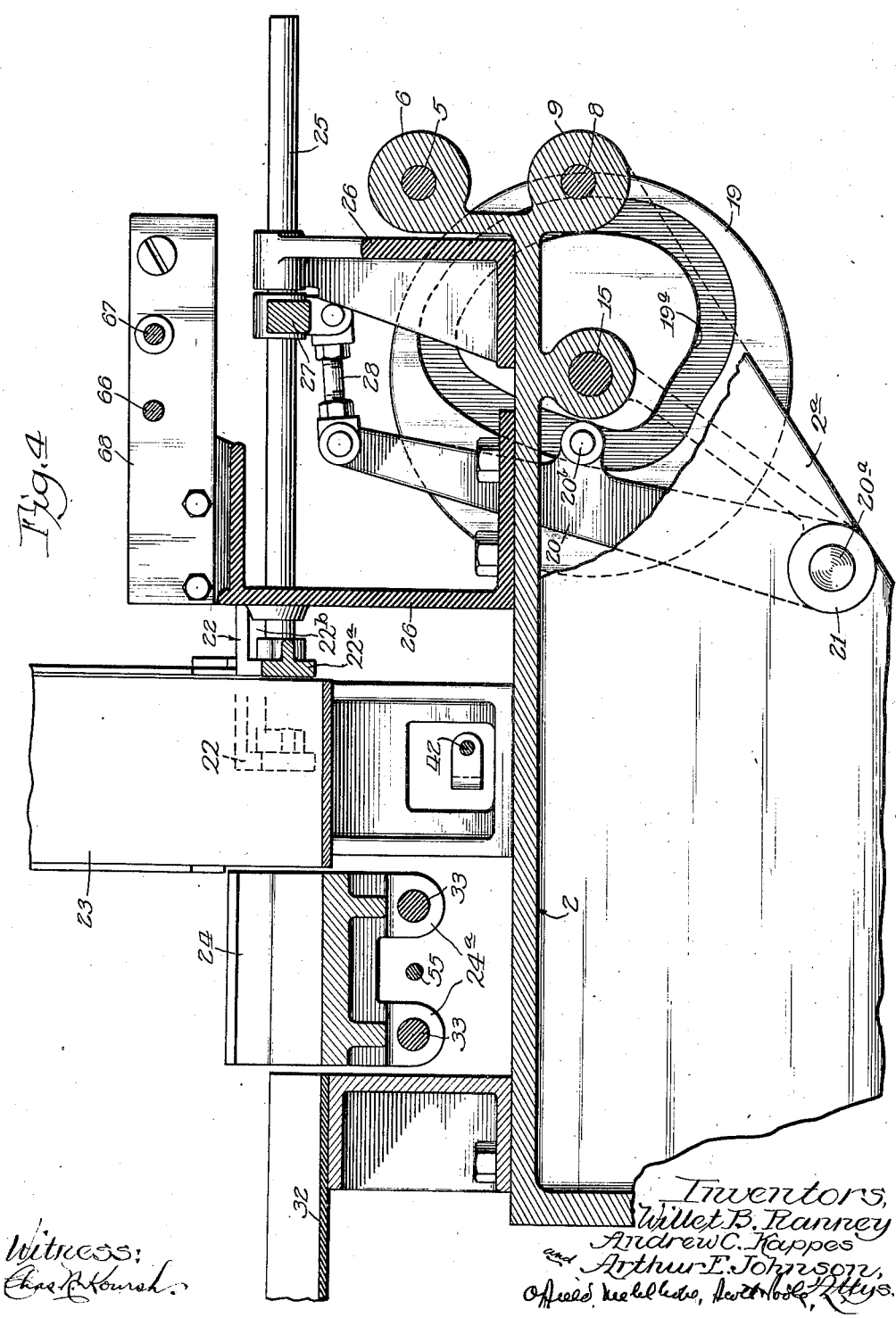

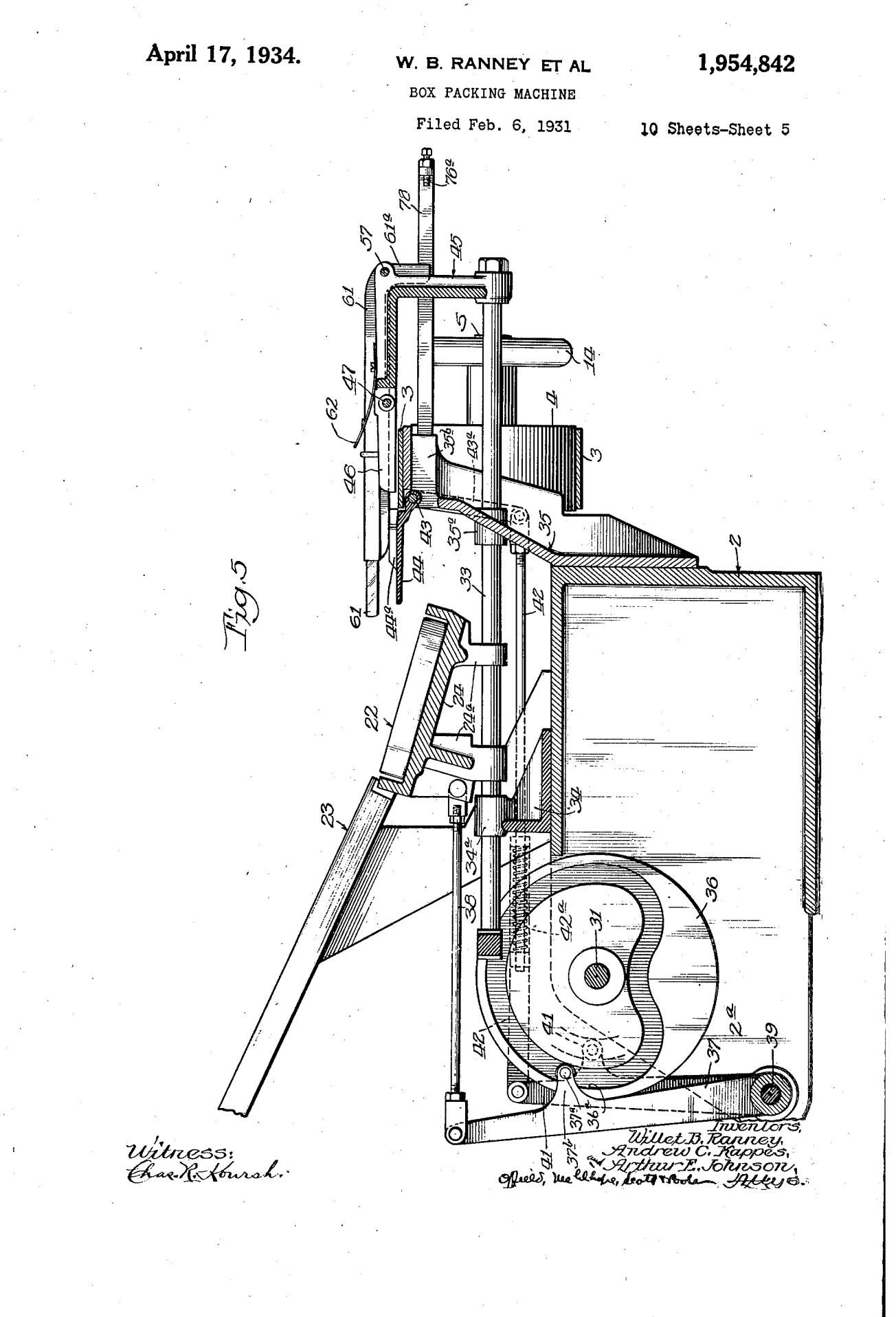

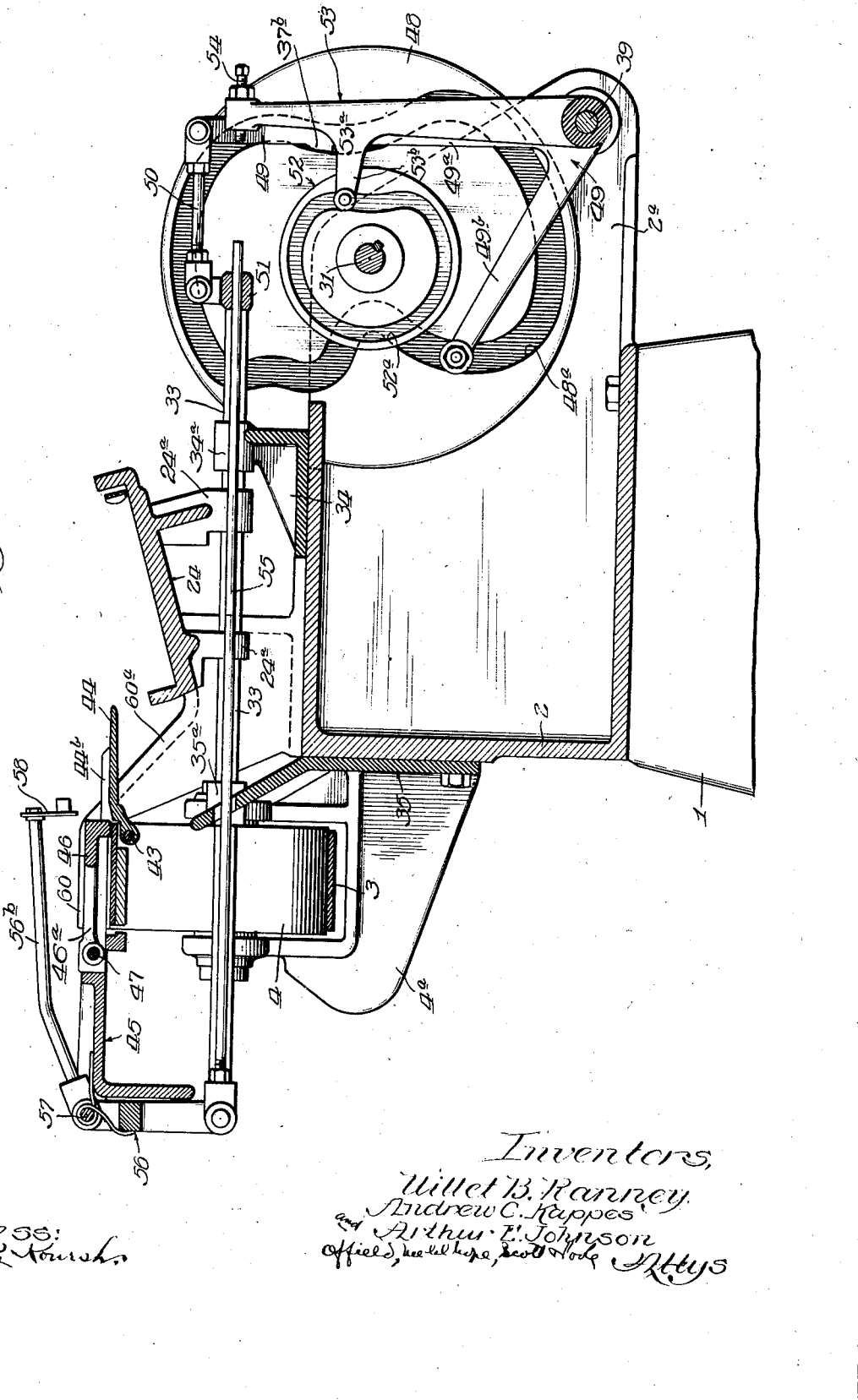

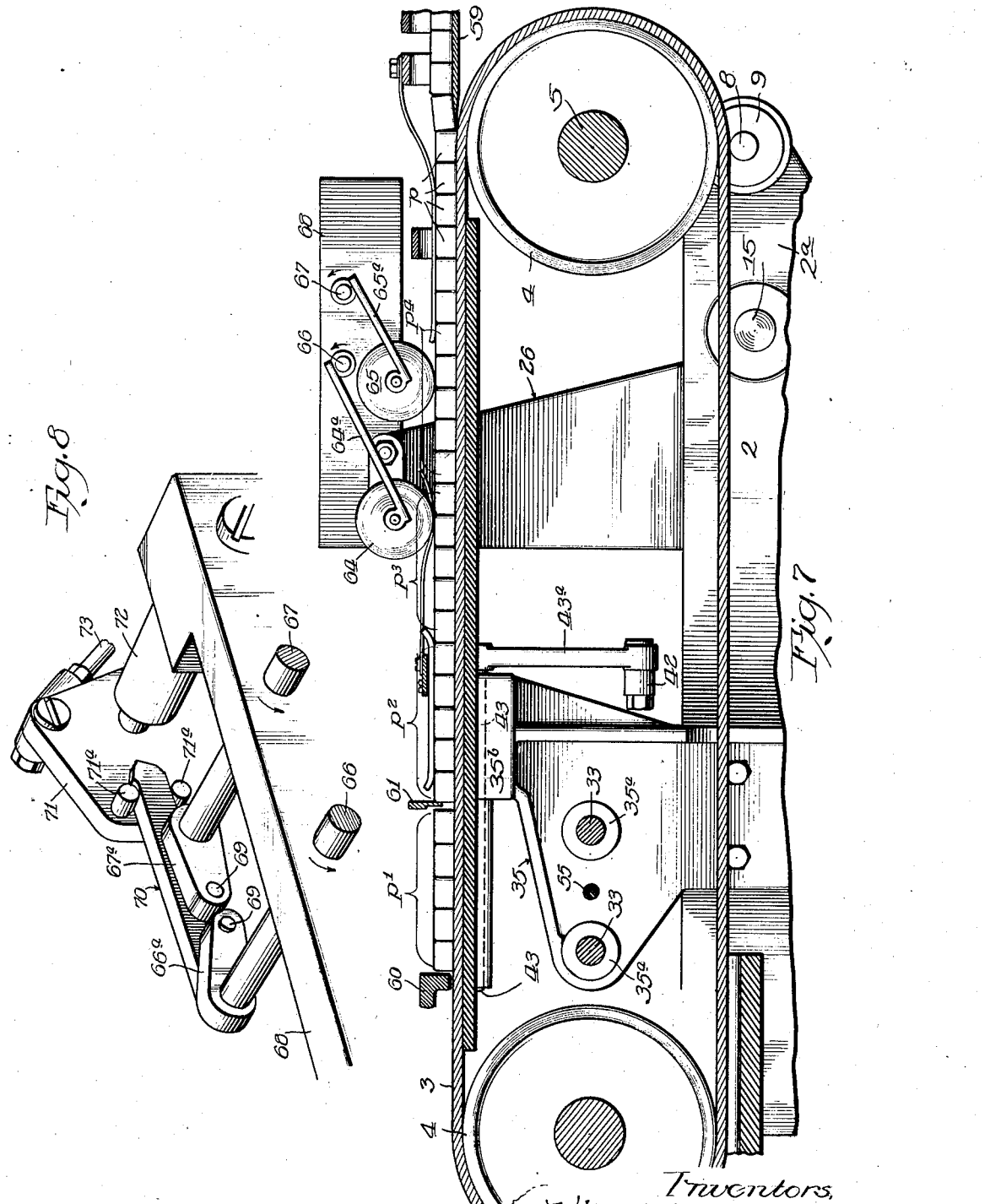

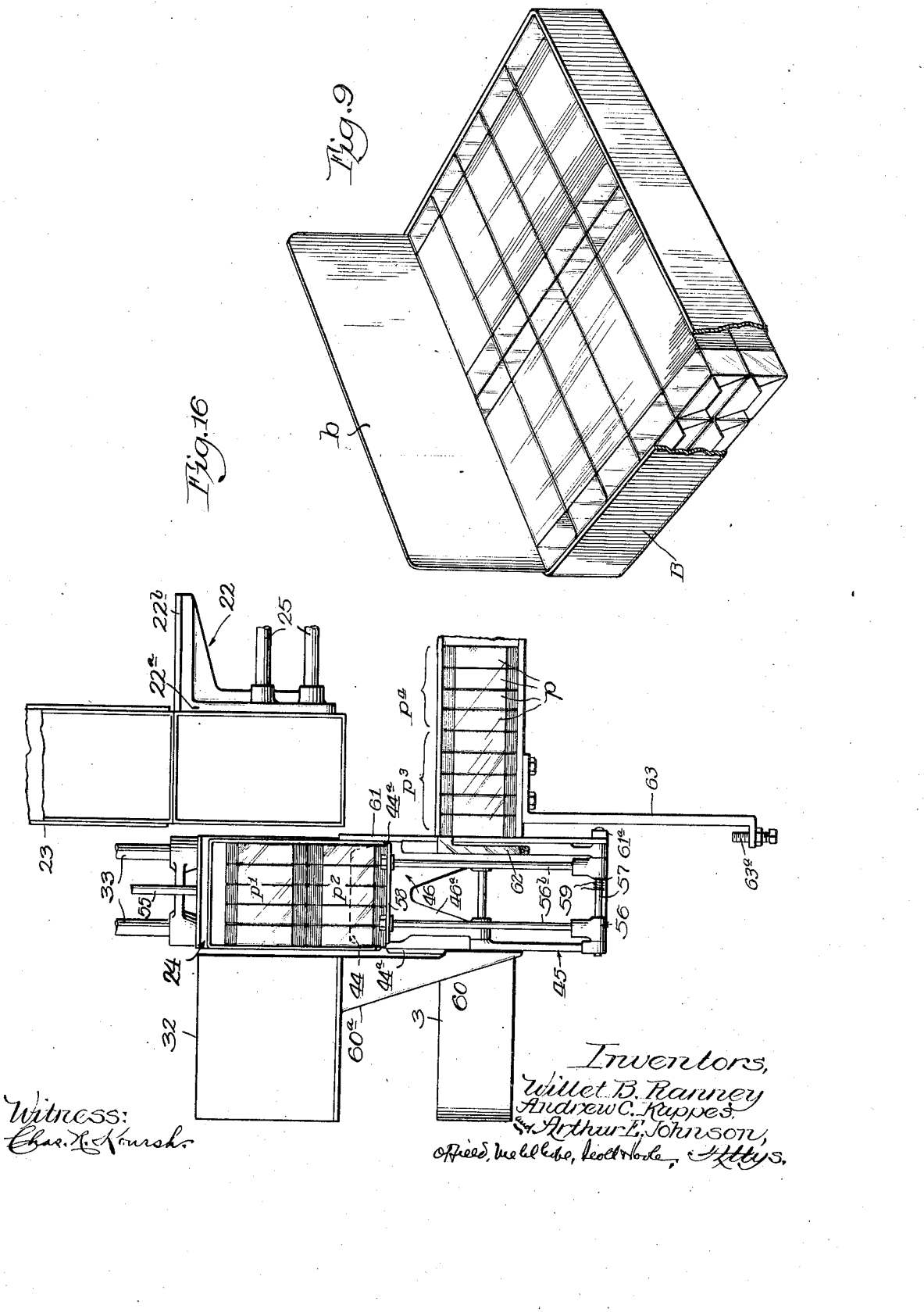

April 17, 1934.  W. B. RANNEY ET AL  1,954,842
BOX PACKING MACHINE
Filed Feb. 6, 1931  10 Sheets-Sheet 9
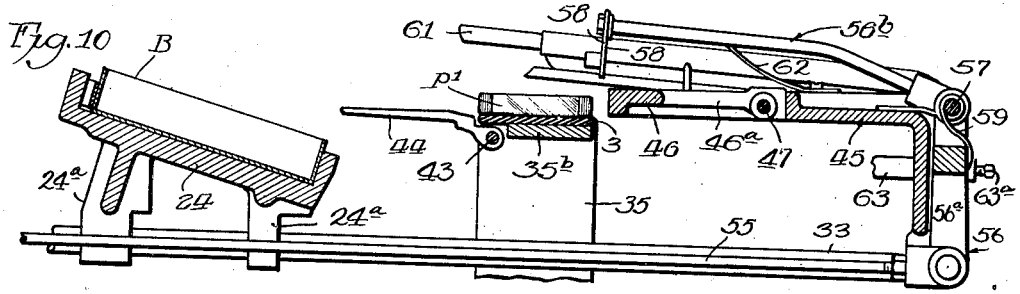
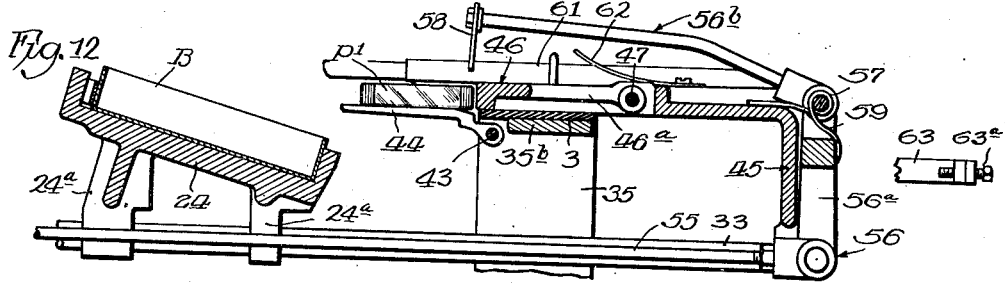
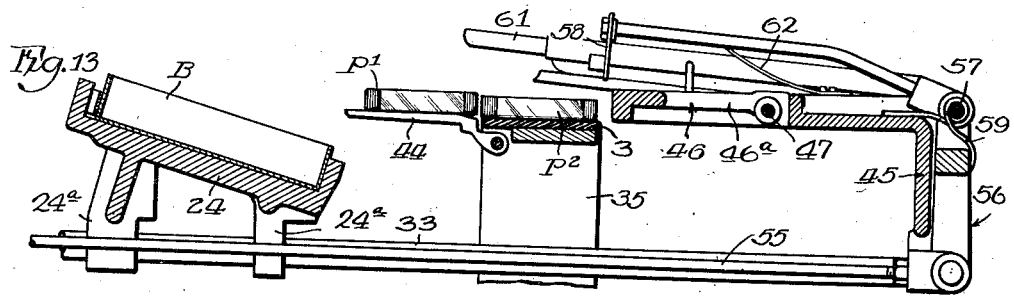
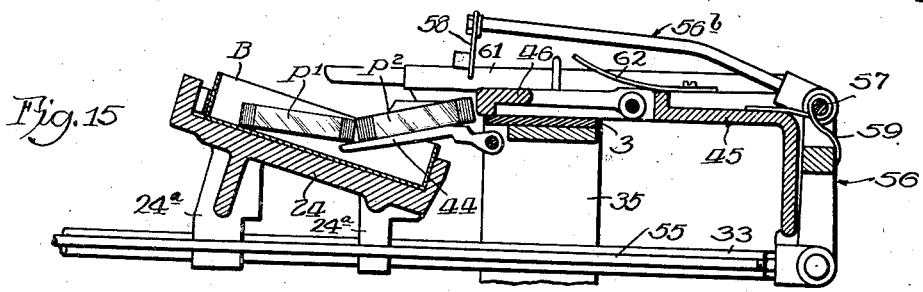
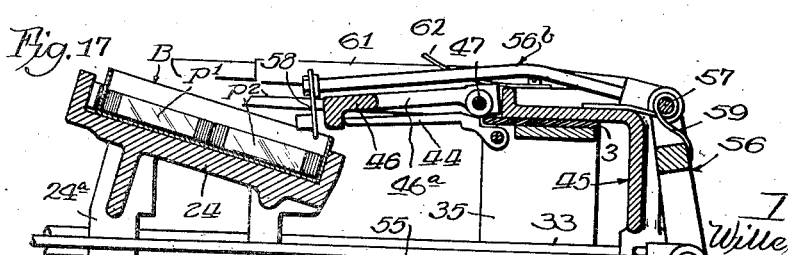

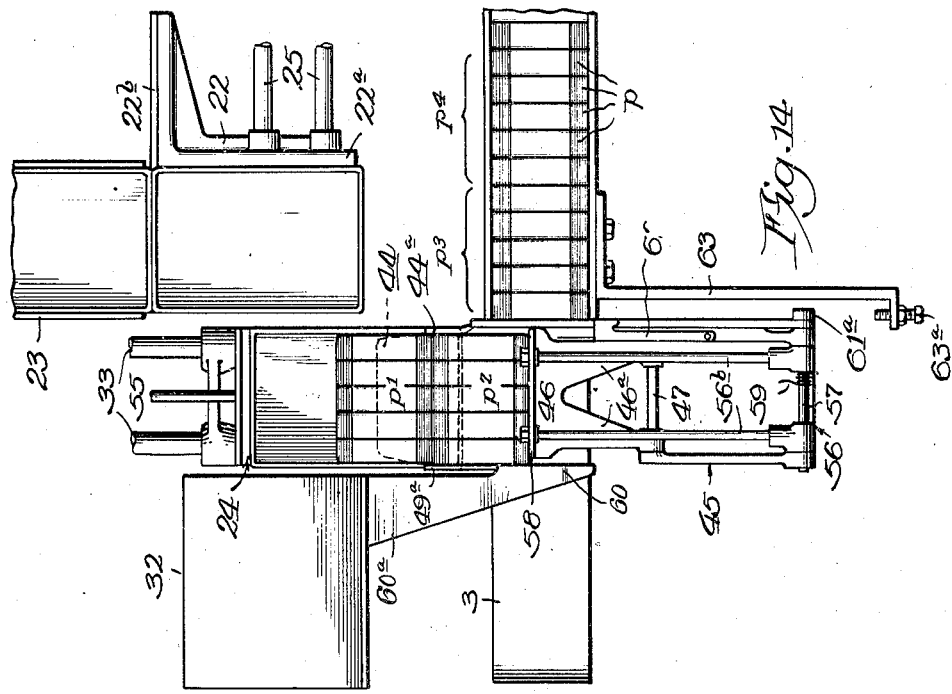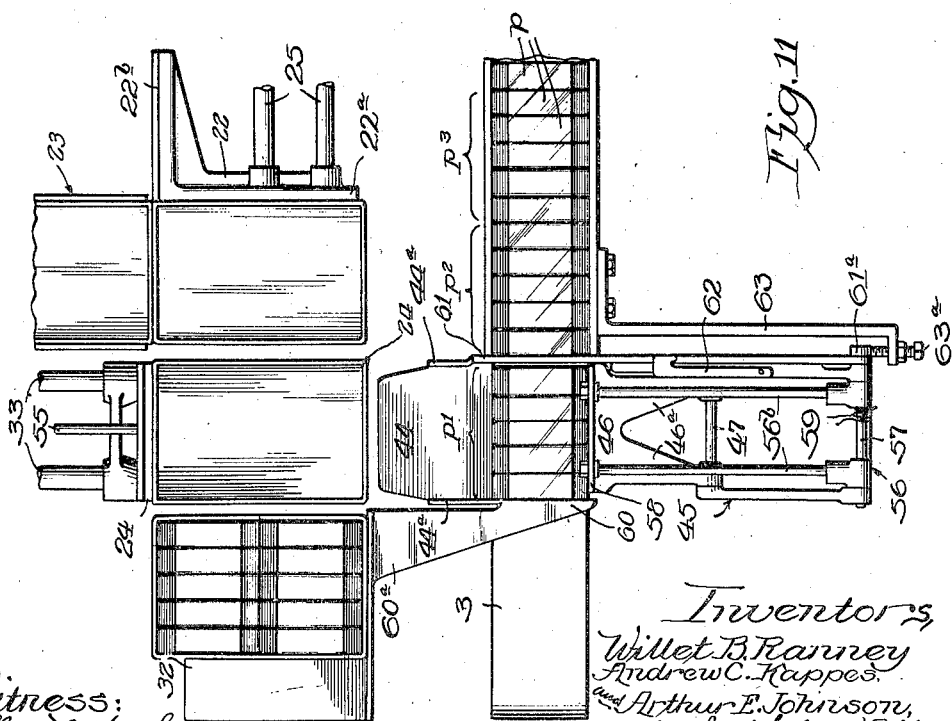

Patented Apr. 17, 1934

1,954,842

UNITED STATES PATENT OFFICE 1,954,842

BOX PACKING MACHINE

Willet B. Ranney and Andrew C. Kappes, Chicago, and Arthur E. Johnson, Oak Park, Ill., assignors to Wm. Wrigley Jr. Company, Chicago, Ill., a corporation of Delaware Application February 6, 1931, Serial No. 513,982

25 Claims. (Cl. 226—14)

This invention relates to improvements in box packing machines, and more particularly to an improved machine for packing articles or packaged goods into boxes or containers.

The object of the invention is to provide a machine which will perform the operations heretofore accomplished by hand labor, and in so doing keep pace with the wrapping operation with the result that the production of packaged goods in boxed or carton form may be materially increased, and the wrapping and packing operations be made continuous.

The machine herein disclosed in one especially designed to be used in the manufacture of chewing gum, although it is equally well adapted for other package consumable products, such as hard candies, mints and the like. Packaged goods of this variety are wrapped by special wrapping machines, and with the increased speed that some of these machines have attained and other types capable of attaining, the need for a machine to pack the output of a wrapping machine has led to the development of mechanism which will perform automatically and mechanically the operations which heretofore have been accomplished by operators.

In the present disclosure, the package boxing operation is preferably a continuation of the package wrapping operation, and while they are essentially separate operations, it is preferred to associate them, so that the packages are fed directly from the wrapping to the boxing machine, without interruption or intermediate handling. It will be understood, however, that each machine may be, and in fact is, a separate unit, although synchronized so that the proper relative speeds are maintained.

A preferred embodiment of our invention is disclosed in the accompanying drawings, in which:

Figure 1 is a general top plan view of the machine.

Figure 2 is a general view of the machine in front elevation.

Figure 3 is an enlarged view of the machine in side elevation, as taken from the right in Figure 1.

Figure 4 is an enlarged detail view in vertical section taken on line 4—4 of Figure 1.

Figure 5 is an enlarged view in vertical section through the box loading mechanism, as taken on line 5—5 of Figure 1.

Figure 6 is a view similar to Figure 5, but taken on line 6—6 of Figure 1 slightly to the left of line 5—5 and in the opposite direction.

Figure 7 is an enlarged detail view in vertical section of the package feeding belt and associated parts as taken on line 7—7 of Figure 1.

Figure 8 is an enlarged detail view in perspective of the mechanism actuated by the detector rollers for controlling the clutch mechanism for automatically stopping the machine.

Figure 9 is a perspective view of a filled box as discharged from the machine.

Figures 10 to 17, inclusive, are diagrammatic views showing the relative positions of the various parts of the box and package handling mechanism during the packing of a box. Figures 10, 12, 13, 15 and 17 are views in vertical section, and Figures 11, 14 and 16 are top plan views.

As an introduction to the description of the machine, its action will be first discussed generally, and particularly as it relates to the wrapping machine with which it co-operates. The function of the wrapping machine is well understood, namely, to wrap the goods into package form, which in the case of chewing gum is of the familiar elongated rectangular shape. The packages are discharged from the wrapping machine onto a horizontal track, and are advanced edgewise in a solid line at a speed determined by the rate of discharge.

The manual packing operation is performed by an operator standing at the end of the discharge track, and holding the open shallow boxes in one hand, transfers groups of several packages each from the track onto the boxes with the other. Thus visualizing the hand operation, the statement that the machine practically duplicates the same steps will assist in understanding its operation. The package feed from the wrapping machine to the packing machine is continuous, although frequently the feed is interrupted by faulty action of the wrapping mechanism, necessitating a temporary stoppage. For this reason the packing machine includes auxiliary mechanism operating through detectors for effecting the idling of the package and box handling parts of the machine until the continuous feeding of the packages is restored, that is, until there is a solid line of packages advancing along the discharge track from the wrapping machine to the box filling station.

The packing machine is supported on a base or pedestal 1, the operating mechanism being mounted on a box-like frame 2 bolted to the top of the pedestal, its main portion being channel shaped and opening rearwardly, and its end walls being extended rearwardly to form wings 2a as shown in Figure 5. As is common in machine design, the various parts of the machine are bolted directly to this frame 2 or supported by brackets which are bolted thereto.

Referring to Figures 1 and 2, the main parts of the machine will be located and identified. At the front of the machine is an endless feed belt 3 of leather or other suitable material which travels on pulleys 4—4 journalled in bearing brackets 4a, 4a mounted at opposite ends of the machine frame 2, the left-hand pulley bearing (Figure 2) permitting horizontal adjustment of the pulley to regulate the tension of the belt. The right-hand pulley 4 is mounted on a counter-shaft 5 extending rearwardly and transversely of the driving end of the machine and journalled in a bearing sleeve 6 at the end of the frame 2, said shaft extending some distance beyond said bearing and having its rear end journalled in a bearing sleeve 7a of a bearing bracket 7 bolted to the side face of the frame 2 (Figure 3). Immediately below the counter-shaft 5 is a stub shaft 8 which is journalled in a bearing sleeve 9 immediately below the bearing sleeve 6. Mounted on the rear end of the shaft 8 and close to the bearing sleeve 6 is a large sprocket wheel 10 carrying a chain 11 extending to a sprocket pinion on the wrapping machine (not shown) and through which the power for driving the packing machine is transmitted.

At the forward end of the stub shaft 8 is a spur gear 12 meshing with a slightly larger spur gear 13 on the countershaft 5 between the bearing 6 and the belt pulley 4, a hand wheel 14 being mounted on the shaft in front of the pulley for convenience in operating the machine when making minor adjustments.

Just inwardly beyond the stub shaft 8 and slightly below the same is the main driven shaft 15 extending fore and aft and journalled at its forward end in the front wall of the frame 2, and at its rear end in bearing sleeve 7b integral with the bearing bracket 7 (Figure 3). This shaft is driven through a large spur gear wheel 16 mounted adjacent its rear bearing 7b and meshing with a smaller gear wheel 17 on the counter-shaft 5. The large gear wheel 16, however, is loosely mounted on the shaft 15, although normally connected therewith through a clutch 18 which will be later disclosed in detail.

Keyed to the driven shaft 15 just forwardly of the clutch 18 is a large plate or disc cam 19 which is typical of several that are used in imparting the desired movement to a moving part, and in this instance a reciprocating pusher which feeds the empty boxes into position to be packed. Coacting with this plate cam is a cam follower 20 having the form of a lever arm assuming a vertical position just in front of the cam plate 19 (Figures 3 and 4) and journalled at its lower end in a bearing sleeve 21 at the front of the machine frame through the medium of a stub shaft 20a extending at right angles to the lever proper. The length of the cam follower or lever 20 is slightly greater than the diameter of the cam plate, and midway of its length is a cam roller 20b riding in an endless groove 19a cut in the front face of the cam plate 19 and following a somewhat irregular circular path eccentric to the axis thereof, as shown in Figure 4.

The upper or free end of the cam follower is operatively connected with a reciprocating box feeding member or pusher bar 22 already mentioned, and which is driven with a reciprocating movement in a horizontal path lengthwise of the machine, across the lower end of an inclined chute 23 sloping downwardly from the rear of the machine, and on which the empty boxes are placed to slide by gravity to the lower end where they are successively carried laterally to the left by the pusher bar 22 onto a backwardly and forwardly reciprocating carrier 24, which coacts with the package transporting mechanism to complete the filling of the boxes from the line of packages being advanced along the feed belt.

Returning to the pusher bar 22, this member is an L-shaped casting having two webs at right angles to each other, one (22a) extending lengthwise of and parallel with the bottom portion of the chute, and the other (22b) crosswise above the bottom edge of the chute, which is turned up to form a stop 23a. The distance from the lower edge of the chute to the transverse web 22b of the pusher bar is equal to the length of a single box, so that as each box reaches the bottom of the chute it is pushed laterally with the forward stroke of the pusher bar, the boxes above being held back by said transverse web 22b until the plate has cleared the chute on the return stroke, whereupon the next box slides downward in front of the plate, and so on. The pusher bar assumes the same inclination to the horizontal as the chute, and hence its carrying and bearing members are also inclined to the horizontal.

The pusher bar is mounted at the forward or left ends (Figures 1 and 4) of a pair of parallel rods 25, 25 which are supported for endwise sliding movement in a pair of bearing brackets 26, 26 bolted to the top face of the machine frame 2, and spaced apart, one centrally and the other adjacent the (right) end thereon (Figure 4). Connecting the two rods 25 midway of their ends is a cross-head 27 which has pivotal connection with a horizontal and endwise adjustable link 28, having pivotal connection at its opposite end with the upper end of the cam follower or lever 20, and through which an intermittent reciprocating motion is transmitted to the pusher bar 22.

As thus far described, the power for driving the machine is transmitted through the sprocket driven shaft 8 and thence to the counter-shaft 5 through the gear wheels 12 and 13, thereby driving the feed belt 3 and also the main driven shaft 15 from the pinion 17 on shaft 5 to the large gear wheel 16 on said shaft 15. And lastly, the plate cam 19 on the driven shaft 15 drives the pusher bar 22 through the medium above described, providing the clutch 18 is not released, it being apparent that when this takes place, the pusher plate stops and the box feeding operation is interrupted. The clutch 18 may be of any standard or well known type suitable for connecting a loose gear wheel on a shaft, although its details of construction will later be described in connection with the detecting devices which act to release the clutch if the package feed should be interrupted for any reason.

Now to proceed with the package feeding mechanism which removes the packages from the end of the feed belt and deposits them in the boxes, reference is again made to the main driven shaft 15. It will be observed that at the extreme rear end of this shaft (Figure 3) is keyed a miter gear 29 which meshes with a slightly smaller miter gear 30 keyed on the end of a secondary driven shaft 31 extending at right angles to the main driven shaft 15 along the rear of the machine and journalled in bearings 31a, 31a at the rear upper portion of the end walls 2a of the frame 2 (Figure 1).

On this secondary driven shaft 31 are mounted the cam members for operating the sliding box carrier 24 and the package feeding mechanism. Referring to Figures 1 and 5, the box carrier 24, located at the lower end of the box chute 23, consists of a plate flanged at its front and rear ends, but open along its sides. The plate is tilted at an angle of about 30° to the horizontal and parallel with the lower end portion of the chute, which terminates at its lower end in a less abrupt slope than the upper portion so that the surface thereof is in the same plane as the bottom surface of the carrier 24 as well as the lower edge of the pusher bar 22. On the opposite side of the carriage from the chute 23 is a receiving platform or track 32 (Figure 1) onto which the loaded or filled boxes are delivered as they are pushed from the carrier by the next empty box transferred from the chute to the carriage by the forward stroke of the pusher bar 22.

Proceeding now to the support for the package feeding mechanism as well as the box carrier, there will be found extending transversely of the machine beneath the carrier 24 a pair of parallel endwise sliding rods 33, 33 supported in bearing brackets 34, 35 bolted to the top and vertical front walls, respectively, of the frame 2. The bracket 34 is located near the rear edge of the top wall of said frame and has bearing sleeves 34a, while the front bracket 35 extends some distance above and outwardly in front of the frame 2, and in addition to having integral bearing sleeves 35a through which the slide rods extend, forms a support for the package feeding mechanism located above and adjacent the upper lead of the feed belt 3 and opposite the box carriage 24 (Figures 4 and 6). The length of these slide rods is approximately twice the distance between the points of bearing support, thus indicating an endwise or reciprocating movement, the nature of which will presently be fully disclosed. The box carrier 24 is slidably mounted on these rods 33, 33 through the medium of pairs of integral bearing brackets 24a, 24a depending from the under side of said carriage and forming a four-point support therefor on the rods 33, 33 and between the two sets of bearings of the latter.

As will now be pointed out, the box carrier 24 has a reciprocating sliding movement on said rods, while the latter have an independent reciprocating motion imparted thereto through separate cam mechanism. Thus assuming for the moment that the rods 33, 33 are stationary supports for the sliding carrier 24, the latter is actuated by a plate cam 36 (Figure 5) keyed to the shaft 31 directly behind the carrier through an intermediate follower 37 and connecting rod 38.

The cam follower 37 has the form of a lever journalled at its lower end on a bearing shaft 39, extending between the lower rear corners of the webs 2a, 2a of the frame 2, and used in common with the cam followers of other cams keyed to the driven shaft 31. The cam follower 37 has a cam roller 37a mounted at the end of a short arm 37b near its upper end which rides in a groove 36a in the face of the plate cam 36, while the upper end of the cam follower is connected with the rod 38 which extends forwardly and has suitable pivotal connection with the sliding carrier 24 at a point behind its rear bearing bracket 24a. The groove 36a in the plate cam is laid out for an intermittent reciprocating motion, that is to say, the groove is concentric with the center of the plate throughout one-half of its circumference, and then curves abruptly toward the center, thus indicating that during one-half a revolution of the cam the carriage remains stationary in its retracted position in alignment with the end of the chute 23 as shown in Figure 4, and during the other one-half revolution it is advanced forwardly and rearwardly with a uniform reciprocating movement.

At this point it may be mentioned that the same type of plate cams and followers are used for actuating the several co-acting parts of the box filling mechanism, and since the precise movement and timing of the parts is a matter of properly designing and adjusting the cams, it is not thought necessary to describe the remaining cams with the same detail as to design, although the movement imparted to the part actuated thereby will be made clear.

Immediately beyond the plate cam 36 (Figures 1 and 5), and likewise mounted on the shaft 31, is another plate cam 40 driving a follower 41 mounted on the bearing shaft 39, and having pivotal connection at its upper end with a horizontal connecting rod 42 extending forwardly to the front end of the machine and terminating at one side (Figure 7) of the bracket 35, where it is connected with a depending lever arm 43a fixed at one end of a rock shaft 43 extending lengthwise of the machine, and journalled in the inner edge of a flat bearing block 35b at the top of said bracket 35. Mounted on this rock shaft 43 on the opposite side of the bearing block 35b (Figure 5) from the lever arm 43a is an inwardly projecting feed plate 44 normally extending horizontally toward the carrier 24 from the inner edge of the upper lead of the feed belt 3 with its surface flush therewith, the side edges of the plate being flanged as at 44a for one-half its length and tapering slightly throughout its outer end portion both in thickness and in width. By the action of the cam connected with the push rod 42, this feed plate is periodically and intermittently depressed so that its outer edge drops into the box being advanced forwardly in the carrier to provide an inclined track along which the packages slide as they are deposited in layers within the box.

In order to impart a certain flexibility in the action of this feed plate 44, the connecting rod 42 consists of two sections having sliding connection with each other and a coil compression spring 42a yieldingly opposing their relatively endwise movement, but permitting the movement of the follower to be taken up should an obstruction prevent the normal action of the feed plate 44 (Figures 3 and 5).

At the outer ends of the sliding rods 33, 33 there is mounted the package feeding carriage consisting of an assembly of parts mounted on an L-shaped frame member 45 extending upwardly from the ends of the rods 33, and thence rearwardly above the upper lead of the feed belt 3. A pusher plate 46 is hinged to the free edge of the horizontal portion of the frame member 45, the same being flanged at its forward edge to present a wide vertical face to the packages, and the portion immediately behind the flange being recessed in V-shape to provide arms 46a, 46a which have pivotal connection at their ends with a transverse hinge pin 47 (Figure 1). Other parts co-operating with the pusher plate complete the package feeding carriage, and these will be presently identified and described.

The drive for the reciprocating carriage is through a cam similar to those already described, namely, a large plate cam 48 keyed to the shaft 31 and located just inwardly from its left-hand bearing 31a (Figures 1 and 6). This plate cam is a circular disc having a groove 48a in once face thereof, and coacting therewith is a cam follower 49 having the form of a bellcrank lever journalled on the fixed shaft 39 and having arms 49a and 49b spaced apart at 30° angles. The longer arm 49a of the follower extends vertically and is connected at its upper end by a link 50 with a cross head 51 mounted at the rear ends of the rods 33, 33. The shorter arm 49b has a cam roller at its end riding in the groove 48a in the cam plate 48. The shape of the groove is somewhat too irregular for description, although the movement imparted to the package feeding carriage may be described generally as an intermittent reciprocating motion.

Immediately adjacent the large plate cam 48 is a smaller plate cam 52 (Figure 6) keyed to the driven shaft 31 and coacting with a cam follower 53 in the form of an upright lever arm journalled on the bearing shaft 39 and having a forwardly extending arm 53a carrying a cam roller engaging a cam groove 52a on the plate 52. At the upper free end of this follower is mounted an endwise adjustable threaded pin 54 extending crosswise of the lever with one end projecting horizontally in a forward direction. From the shape of the groove 52a of the plate cam 52, it follows that a short rocking movement is imparted to the follower 53 during each revolution of the plate.

Now, extending parallel with and between the pair of sliding rods 33, 33 is a small push rod 55 having endwise sliding bearing at its rear end portion in the cross head 51, and having pivotal connection at its forward end with a package-tucking member 56 in the form of a bell-crank or L-shaped lever pivotally mounted on a pin 57 extending across the outer upper edge of the frame member 45 of the package feeding mechanism. The shorter arm of this L-shaped tucker member is a depending Y-shaped member 56a connected at its end with the push rod 55, and the longer arm is a pair of spaced parallel round bars 56b, 56b extending rearwardly above the pusher plate 46 and supporting at their free ends a vertical tucker plate 58 normally positioned just above and in line with the front edge of said pusher plate (Figures 1, 2 and 6).

A coil spring 59 surrounds the journal pin 57 of the tucker member, with its ends bearing on the frame member 45 and Y-shaped arm 56a in such manner that the tucker plate 58 at the operating end is normally held in elevated position. Moreover, the push rod 55 moves bodily with the package feeding carriage and the rods 33, 33, except when the latter reach the end of their rearward stroke, at which point the follower 53 is advanced forwardly, striking the end of the push rod horizontally a quick forward motion thereto, which is transmitted in a quick downward stroke of the tucker plate 58. The tucking movement occurs at predetermined intervals in the packing operation, as will be presently explained in detail.

Referring now to Figure 3, the packages p are delivered onto the feed belt 3 and transported to the point or station at which they are first arranged into layers, and then transferred bodily into the boxes. The packages, as heretofore explained, are delivered from the discharge track 59 of the wrapping machine directly onto the end of the feed belt which is travelling in a counter-clockwise direction, so that the packages travel from right to left, lying transversely of the belt on their wider faces and in close order.

On reaching a point near the opposite (left) end of the belt, the packages encounter a stop member 60 extending across the path of the packages just above the surface of the upper lead of the feed belt and in alignment with the far edge of the pusher plate 46. This stop member is formed as the extremity of an upwardly and forwardly extending tapering extension of a bracket 60a supporting the receiving track 32 for the filled boxes, and located to the left of the box carrier 24 (Figures 1 and 6).

Referring now to the box filling operation, it will perhaps aid in understanding the steps followed to visualize a box B with its contents, as shown in Figure 9. The box is an open shallow container to which is applied a cover after it is filled. A flap or fly b for display purposes is attached along one of its longer sides, although this has been omitted from the box in the other figures. The box is slightly elongated in one direction, and otherwise dimensioned to hold the layers of packages, each layer consisting of two rows end to end of five packages each. In other words, the packages extend lengthwise of the box, and are grouped in four rows of five each, or twenty packages in all.

Now, the five-package row is the unit for the handling of the packages, so that in Figure 7 the first four successive groups or five-package units $P^1$, $P^2$, $P^3$ and $P^4$ constituting the contents of a single box, are shown as being advanced along the belt with the first group $P^1$ in contact with the stop member 60 and about to be transferred from the belt. It may be mentioned in passing that suitable marginal guides and spring presser fingers are located along the path of the packages as they travel with the belt so as to keep them in alignment and in closed formation. In addition to these guiding members, there are two detector discs 64 and 65, located above the line of moving packages on the belt and acting to detect gaps therein and to actuate the clutch 18, thereby stopping and starting the machine when occasion requires. The details of the detector responsive clutch mechanism will be later discussed, inasmuch as it constitutes the auxiliary or secondary part of the machine.

Thus, with the first group $P^1$ of packages brought to rest against the stop member 60, a coacting stop member 61 in the form of a long thin bar or blade normally lies across the path of the packages in alignment with the near edge of the pusher plate 46 and on the opposite side thereof from the fixed stop member 60 where it acts to momentarily hold back the advancing line of packages while the group of packages immediately ahead is being removed from the feed belt. This stop member 61 is pivotally mounted at the outer edge of the frame 45 of the package feeding carriage, and more exactly, on the end of the pivot pin 57 which supports the tucker member 56, said blade having a short vertical arm 61a extending downwardly beyond the pivot pin and the frame member 45 of the carriage. A leaf spring 62 mounted on the adjacent edge of the frame 45 bears upon the top edge of the blade to hold it in horizontal position and in the plane of the advancing packages.

For lifting the stop blade to permit the advance of the packages after each forward stroke of the package feeding carriage, an arm 63 in the form of a bar is mounted on the front bracket 35, and projects outwardly parallel with the stop member 61 and has at its outer end an adjustable contact screw 63a in line with the lever arm 61a of the stop member, so that at the end of each forward or return stroke of the carriage, the stop member is tilted upwardly to permit the next group of packages to pass beneath it and occupy the station between it and the stop member 60. Then upon the commencement of the forward stroke of the carriage, the stop is lowered by gravity, thereby retarding further advance of the packages until the packages ahead have been cleared from the belt.

Having thus identified all of the parts which coact in the handling of the packages as well as the boxes, the packing operation will now be described with the assistance of the diagrammatic or position views of Figures 10 to 17, which have been numbered in the order of sequence of operations, although some of the views (Figures 10, 12, 13, 15, 17) are in vertical sections and others are top plan views (Figures 11, 14, 16).

Figure 11 shows the successive positions of the empty boxes as they are fed to the machine, being first placed in the upper end of the chute, then moving by gravity to the bottom thereof and into the path of the pusher bar 22 which then moves laterally and to the left, sliding the empty box onto the carrier and simultaneously forcing the filled box ahead of it onto the delivery track or platform 32.

Assuming then that an empty box B has just been placed in filling position on the carrier 24, the successive steps in filling the box will now be followed through. Bearing in mind that the box carrier 24 and the package feeding carriage move toward and from each other in a line transversely of the feed belt 3, a complete cycle of operation starts with the package feeding carriage in fully retracted position (Figure 10) with the bladelike stop member 61 elevated to allow the packages to advance beneath it and fill the space between it and the stationary stop member 60 (Figure 11). As the carriage starts its stroke to the left, the edge of the pusher plate 46 comes into contact with the first group $P^1$ of packages $p$, and slides them endwise from the feed belt 3 onto the guide plate 44 (Figure 12), it being observed that the box carrier 24 remains stationary, and that the carriage travels only the width of the feed belt, that is, only far enough to push the packages $P^1$ from the belt onto the guide plate 44.

From this point the carriage is retracted to its starting position (Figure 13) and the stop blade 61 is again momentarily lifted, permitting the next group of packages $P^2$ to advance to the fixed stop 60 and directly behind the first group $P^1$ previously transferred to the plate 44. The first layer of packages are now in the formation which they assume when deposited in the box.

Now, the carriage moves forwardly again, sliding the second group $P^2$ with the first group $P^1$ ahead of it, from the feed belt over the guide plate 44 and into the box B, which in the meantime has been carried forward by the advancement of the carrier 24 until its front edge is well beneath the guide plate 44, as shown in Figures 14 and 15. At the same time the guide plate 44 is tilted downwardly through an angle of, say, 15°, so that its front edge drops into the box and lies just above the center of its bottom. Thus the first group $P^1$ of packages pass from the downwardly inclined guide plate 44 on to the upwardly inclined bottom of the box and continue to slide toward the rear end thereof.

It is to be noted in connection with the second advance stroke of the carriage that the pusher plate 46 travels fully twice the distance that it did on the first or preceding stroke, as its function now is to slide the full layer of packages into the box, where previously the first row of packages were only transferred to the guide plate 44. Moreover the movements of the box carrier 24 and the package carrier are so timed that the return movement of the former starts before the latter has reached the end of its stroke, so that when the rows of packages $P^1$ and $P^2$ have been finally deposited in the bottom of the box, the pusher plate 46 has completed its full stroke to the outer edge of the guide plate 44, the latter having been lifted to clear the front edge of the box, and the carrier 24 having resumed its normal starting or retracted position, as shown in Figures 16 and 17.

It is not taken for granted that the first layer of packages will slide into boxes and arrange themselves perfectly on the bottom of the box, or the top layer upon the first, inasmuch as the fit is quite snug. Consequently the tucker member 56 performs the final operation of pushing or tucking the rear ends of the last row of packages down into the box just after they leave the guide plate 44, the tucker plate 58 being depressed to clear the front edges of the pusher plate 46 and guide plate 44, and force the packages into their proper place, as shown in Figure 17.

The same sequence of operations are repeated for arranging the next groups $P^3$ and $P^4$ of packages, first, into a layer, and then sliding it bodily into the half filled box and on top of the bottom layer previously placed. Thus, by following through the same sequence of steps just recited, but assuming the second or top layer is being handled instead of the first or bottom layer, the operation of filling each box can be readily visualized.

It is manifest that upon the completion of each filling operation, the carrier returns to its starting position and in line with the pusher bar 22 and the next empty box to be filled, said bar now advancing to slide the filled box from the carrier 24 and replacing it with an empty box, whereupon the same filling operations are repeated.

From the foregoing discussion of the box filling or packing operation, it will be noted that a continuous package feed from the wrapping machine or other source is necessary, that is to say, the packages must be fed onto the belt without extended breaks or gaps in the line, although small spaces between packages or groups of packages may do no harm, as the feed is intermittently retarded, thus tending to restore the solid line of packages.

However, should a break of considerable length occur in the feed line, then it is necessary to stop the box-packing mechanism of the machine temporarily until the normal package supply is restored, for otherwise the boxes will only be partially filled.

It is the purpose of the detector discs or rollers 64 and 65, already identified, to detect the faulty feed of the packages and to release the clutch 18 and thus stop the operation as well as to start it again when the normal conditions of feed have been restarted. Now, these detector rollers 64 and 65 are metal discs journalled at the ends of rocker arms 64a and 65a, respectively, which normally assume an inclined position as the disc roll in contact with the line of moving packages. The roller supporting arms 64a and 65a are secured at their upper ends to a corresponding pair of parallel rock shafts 66 and 67 extending transversely of and rearwardly from the feed belt and journalled in a pair of parallel vertical bearing plates 68, 68 bolted to the upper ends of the upright brackets 26, 26 located just behind the feed belt 3 (Figures 1 and 7). Mounted on the rear ends of these rock shafts 66 and 67 are short rocker arms 66a and 67a extending horizontally toward each other with their ends adjacent each other. These short arms are connected by pivot pins 69, 69 at their ends with a toggle arm 70, which extends laterally from the pivoted ends of the arms and overlap the marginal portion of a crank plate 71 journalled to rock in a vertical plane on a bearing pin 72 projecting rearwardly from the rearmost bearing plate 68. The crank plate 71 is provided with a pair of pins 71a, 71a near its edges, one above and the other below the free end of the toggle lever 70.

A connecting rod 73 is pivotally connected with the crank plate 71 at a point above and offset radially from the bearing pin 72, and extends in a downwardly inclined direction toward the clutch assembly 18 on the main driven shaft 15, and connected with the vertical arm 74a of a bell-crank lever 74 journalled on a forwardly extending bracket 75 fixed to the rear main bearing bracket 7 of the driven shaft 15 (Figure 3). This bell-crank lever 74 actuates the clutch mechanism 18 to release the large driving pinion 16 loosely mounted on the shaft 15, but normally connected thereto. The details of the clutch mechanism has been purposely omitted, inasmuch as any standard type of friction or positive acting clutch may be employed.

It is to be observed that not only are two detector rollers used, but they are spaced apart in the line of the package feed, the distance between the points of contact of the rollers with the packages being approximately equal to the length of one group of five packages. By this arrangement, the clutch 18 is not released until both of the detector rollers are depressed by the absence of packages beneath them at the same instant, thus indicating a gap or space of at least five packages which should be rectified or closed up before the box filling operation is continued.

Referring to Figures 7 and 8, it follows that in case of a complete failure of the package feed and both detector discs are depressed by their own weight, that both the rock shafts 66 and 67 rotate through a small angle in a counter-clockwise direction, as shown by the arrows in Figure 8.

Now the lever arms 66a and 67a on the rock shafts projecting toward each other and having pivotal connection with the toggle lever 70 at points offset lengthwise of said lever, it is apparent that the depression of one or the other of the detector discs has no effect on the toggle lever 70, but when both discs are depressed, a toggle action takes place, the arm 66a rocking upwardly and the arm 67a downwardly, thus imparting a downward thrust at the end of the lever 70 which is transmitted to the crank plate 71, rocking the same in a counter-clockwise direction, imparting an endwise movement to the connecting rod 73 which rocks the bell-crank clutch lever 74 and thus actuates the clutch members to release the gear wheel 16 from the shaft 15, which, being positively driven from counter-shaft 5 by the gear wheel 17, continues to turn loosely or idle on the shaft 15. As a result, therefore, all mechanism driven from the shaft 15, as well as the shaft 31, immediately comes to a stop, which includes the entire machine with the exception of the feed belt 3 which continues its movement as long as the wrapping machine is in operation.

The foregoing completes the description of the construction and operation of the machine embodying the invention, it being understood that the several parts and mechanism thereof may be variously modified, altered and otherwise designed to function in a manner to produce substantially like results without departing from the spirit of the invention. It is, therefore, understood that the invention is not to be limited to the exact disclosure or type of machine except in so far as it is set forth in the appended claims.

We claim as our invention:

1. In a package boxing machine, the combination of conveying means for advancing the packages to be boxed, a transfer member movable transversely of said conveying means in predetermined cycles of reciprocating movement, and means cooperating with said transfer member whereby a predetermined number of groups of packages are arranged in a layer and the latter transferred bodily into position for boxing during each cycle of said transfer member.

2. In a package boxing machine, the combination with conveying means for the packages to be boxed, a package transporting member movable transversely of the path of the packages being advanced, a supporting member adjacent said conveying means and means for imparting cycles of reciprocating movements to said transporting member whereby during each cycle a group of packages is removed from the conveying means onto said supporting member, and the next group together with the preceding group are transferred as a layer from said conveying means and supporting member for deposit in a box.

3. In a package boxing machine, the combination with means for continuously feeding packages in close order, a package transfer member movable crosswise of the path of said packages at a predetermined station, a box carrier mounted adjacent said station in line with said package engaging member, and means for imparting cycles of predetermined reciprocating movements to said package transfer member whereby successive groups of packages are arranged in the form of a layer and then transferred bodily into a box during each cycle.

4. In a package boxing machine, the combination of means for conveying the packages to be boxed in close order, a reciprocating pusher member moving transversely of the path of the advancing packages, a stationary supporting member adjacent said conveying means and in line with the path of said reciprocating pusher member, and means for imparting cycles of reciprocating movement to said pusher member whereby each alternate group of packages is transferred onto said supporting member, and the next group together with the previously transferred group is advanced as a single layer into a box positioned to receive the same.

5. In a package boxing machine, the combination with a conveyor for feeding packages toward a predetermined station, a package engaging member moving crosswise of the path of said packages on reaching said station, a box support mounted adjacent said conveyor in line with said package engaging member, a package supporting member intermediate the conveyor and said box support, and means for imparting a cycle of reciprocating movements to said package engaging member whereby a group of packages is transferred onto said package supporting member during one reciprocation, and the same with the next group, is transferred into a box on its said support during the next reciprocation of the cycle.

6. In a package boxing machine, the combination of a package conveyor, a reciprocating carriage moving crosswise of said conveyor and having a pusher member adapted to engage a predetermined number of packages during each stroke and transport them laterally from said conveyor, a supporting plate adjacent said conveyor and in line with the path of said pusher member, a box supporting member beyond said supporting plate, and means for imparting a variable reciprocating movement to said pusher member, whereby successive rows of packages are transported onto said supporting plate, and thence into said boxes.

7. In a package boxing machine, the combination of a continuously moving conveyor, means for feeding packages to be boxed onto said conveyor, a reciprocating pusher member moving crosswise of said conveyor and adapted to engage a predetermined number of packages during each stroke and transport them laterally from said conveyor, a guide plate adjacent said conveyor and in line with the path of said pusher member, a box supporting member beyond said guide plate, means for feeding empty boxes to said support, and means for imparting a variable reciprocating movement to said pusher member, whereby successive rows of packages are transported over said supporting plate and into the boxes.

8. In a package boxing machine, the combination of a feed belt, means for feeding packages onto said feed belt, a reciprocating pusher member located at a predetermined station along said belt, a box carrier movable toward and from said belt, and mechanism for imparting reciprocating movement to said pusher member and box carrier whereby successive groups of packages are transferred from said belt into said boxes in superimposed layers.

9. In a package boxing machine, the combination of a feed belt, means for feeding packages onto said feed belt, a reciprocating pusher member located at a predetermined station along said belt, a guide plate mounted adjacent the edge of said belt, a box carrier movable toward and from said guide plate, and mechanism for imparting reciprocating movement to said pusher member and box carrier whereby successive groups of packages are transferred from said belt onto said guide plate and thence into the boxes.

10. In a package boxing machine, the combination of a feed belt, means for feeding packages onto said feed belt, a reciprocating pusher member located at a predetermined station along said belt, a guide plate mounted adjacent said feed belt and in line with said pusher member, a box supporting member located outwardly from said plate, and mechanism for imparting cycles of reciprocating movements to said pusher member, each including a relatively short stroke for sliding one group of packages transversely from said belt onto said plate, and a relatively long stroke acting to slide the next group of packages together with the first from the belt and plate into boxes fed to said supporting member.

11. In a boxing machine for packaged goods, the combination of a feed belt, means for feeding packages onto said feed belt, a reciprocating pusher member located at a predetermined station along said belt, a hinged guide plate forming a platform adjacent said feed belt, a box carrier located beyond said plate, means for imparting cycles of recprocating movements to said pusher, each including relatively short and long forward and return strokes whereby a group of packages is transferred onto said plate during the short stroke and the next group of packages together with the first are transferred from the belt and plate during the long stroke into boxes fed to said carrier.

12. In a package boxing machine, the combination of means for continuously feeding packages in a horizontal path, a reciprocating pusher member movable transversely of the path of said packages, a supporting plate adjacent said feed belt, a box supporting member beyond said supporting plate, means for imparting a variable reciprocating movement to said pusher member whereby alternate groups of packages are transported from said belt onto said supporting plate and thence with the succeeding group into a box to form a layer, and means for depressing the supporting plate into inclined position during the transfer of the packages into said box.

13. In a package boxing machine, the combination of a package feed belt, a reciprocating pusher member located at a predetermined station along said belt, a supporting plate forming a platform adjacent said feed belt, a movable box carrier located beyond and below the free edge of said plate, and mechanism for successively shifting said carrier beneath said plate and simultaneously depressing the latter toward the bottom of the box whereby successive groups of packages transported from said belt are guided along an inclined surface into the box.

14. In a package boxing machine, the combination of a continuously moving package feed belt, a pusher member movable transversely of said belt from a position on one side thereof, a plate mounted on the other side of said belt and in line with said pusher member, a box carrier movable to and from a position beneath said plate, and mechanism for imparting recurring cycles of movement to said pusher member, plate and box carrier, whereby the packages are transferred from said belt onto said plate by said pusher member and thence into a box supported on its carrier, said plate being depressed into an inclined position to bring its forward edge adjacent the bottom of the box as the carrier is advanced to package receiving position.

15. In a boxing machine for packaged goods, the combination of a feed belt, means for feeding packages onto said feed belt, a reciprocating pusher member located at a predetermined station along said belt, a hinged guide plate forming a platform adjacent said feed belt, a box supporting member located below and beyond the outer edge of said plate, and mechanism for simultaneously imparting reciprocating movements to said pusher member and said box carrier and a downward tilting of said guide plate whereby successive rows of packages are transferred from said belt onto said guide plate as said carrier advances, the box to be filled being stationed beneath said guide plate as the same is tilted to provide an incline to permit the packages to slide onto and along the bottom of the box.

16. In a boxing machine for packaged goods, the combination of a feed belt, means for feeding packages onto said feed belt, a reciprocating carriage having a pusher plate adapted to travel across said belt, a stop member for the packages beyond the path of said pusher plate, a platform adjacent said feed belt in line with said pusher plate, a box carrier movable in a path adjacent said platform, said platform and carrier having a predetermined relative movement whereby the boxes assume an inclined position beneath the outer edge of said platform during the transfer of the packages from said belt by the forward movement of said pusher plate and thence across said platform and into contact with the inclined bottom of the boxes.

17. In a package boxing machine, the combination of a conveyor for advancing the packages in a continuous line, a reciprocating carriage adapted to travel transversely of said conveyor, a stop member movably mounted on said carriage and adapted in one position of said carriage to interrupt the advance of the packages and means acting to shift said stop member in another position of said carriage to permit the packages to be fed into the path thereof.

18. In a package boxing machine, the combination of a conveyor for advancing the packages in a continuous line, a reciprocating carriage adapted to travel transversely of said conveyor, a fixed stop located beyond the path of said carriage and a stop member pivotally mounted on said carriage and projecting in advance thereof from the side opposite said fixed stop, said pivoted stop member being operated to interrupt the forward advance of said packages during a predetermined portion of the travel of said carriage, and to be lifted to permit the advance of the packages to be resumed when said carriage reaches a predetermined position.

19. In a package boxing machine, the combination of a conveyor for advancing the packages in a continuous line, a carriage adapted to move with a reciprocating motion transversely of said conveyor and having a pusher plate adapted to engage a predetermined number of packages during each forward stroke, a fixed stop member located beyond said carriage in the direction toward which the packages are being advanced, a movable stop member pivotally mounted on said carriage, a guide plate hinged adjacent said conveyor and in the path of the packages being transferred from said conveyor, a box carrier movable to and from a position beneath said guide plate, means for tilting said plate to slope from said conveyor to substantially the level of the bottom of the boxes in said carrier, and means for lifting said pivoted stop member on said carriage at the end of its return stroke.

20. In a package boxing machine, the combination of a feed belt for advancing the packages to be boxed in close order toward a predetermined station, a pusher member located at said station and adapted to move transversely over said feed belt with a reciprocating motion consisting of alternate long and short strokes, and a platform mounted adjacent the belt in line with said pusher member and adapted to momentarily support alternate groups of packages transferred from said feed belt during each short stroke of said pusher member, said groups together with each succeeding group of packages being transferred as a layer from said belt and platform during each succeeding long stroke of said pusher member.

21. In a package boxing machine, the combination of a feed belt for advancing the packages to be boxed in close order toward a predetermined station, a pusher member located at said station and movable transversely thereof to transfer successive groups of packages therefrom, a platform positioned in line with said pusher member and adapted to support the packages transferred from said belt, said pusher plate being actuated with a reciprocating motion consisting of alternate short and long strokes, whereby a group of packages is transferred onto said platform during each short stroke and the same, together with the succeeding group, is transferred as a layer from the belt and platform during each long stroke, and means for receiving the layers transferred from said platform.

22. In a package boxing machine, the combination of a feed belt for advancing the packages to be boxed in close order toward a predetermined station, a pusher member located at said station and movable transversely thereof to transfer successive groups of packages therefrom, a platform positioned in line with said pusher member and adapted to support the packages transferred from said belt, said pusher plate being actuated with a reciprocating motion consisting of alternate short and long strokes, whereby a group of packages is transferred onto said platform during each short stroke and the same, together with the succeeding group, is transferred as a layer from the belt and platform during each long stroke, and means for feeding boxes into position to receive the layers of packages as they leave said platform.

23. In a package boxing machine, the combination of a conveyor for advancing packages in a continuous line, a sliding box carrier operative to feed boxes toward and from a package receiving position adjacent one edge of said conveyor, a reciprocating pusher plate operative to transfer a predetermined number of packages from said conveyor during each forward stroke thereof, a plate for guiding the packages from said conveyor into said boxes in package receiving position in which the forward edge of said plate is positioned centrally above the box, and a tucker member operative to force the rear ends of the packages into the box as the carrier is retracted from package receiving position.

24. In a package boxing machine, the combination of a conveyor for advancing packages in a continuous line, a box carrier operative to feed boxes toward and from a package receiving position adjacent one edge of said conveyor, a pusher plate mounted to reciprocate transversely of said conveyor to transfer a predetermined number of packages from said conveyor and toward said carrier during each forward stroke, a guide plate in line with said pusher plate and box carrier and acting to guide the packages from said conveyor into the box, and a tucker member pivotally mounted on said pusher plate and including a blade adapted to be depressed after each box packing operation to tuck the rear ends of the packages into the box as the carrier is retracted from package reeciving position.

25. In a package boxing machine, the combination of a conveyor for advancing packages in a continuous line, a box carrier operative to feed boxes toward and from a package receiving position adjacent one edge of said conveyor, a pusher plate mounted to reciprocate transversely of said conveyor to transfer a predetermined number of packages from said conveyor and toward said carrier during each forward stroke, a guide plate in line with said pusher plate and box carrier and pivotally mounted at the edge of said conveyor, means for depressing the guide plate into a downwardly inclined position with its forward edge clearing the bottom of each box in its package receiving position, and a tucker member pivotally mounted on said pusher plate and including a blade adapted to be depressed to tuck the rear ends of the packages into the box after the carrier has been retracted from package receiving position.

WILLET B. RANNEY.
ANDREW C. KAPPES.
ARTHUR E. JOHNSON.